Jan. 23, 1940.　　M. P. DE MOTTE ET AL　　2,188,277
ACETYLENE GENERATOR
Filed April 24, 1937　　3 Sheets-Sheet 1

INVENTORS
MAURICE P. DEMOTTE
CLARENCE H. BAKER
RALPH C. PIERSON.
BY
ATTORNEYS.

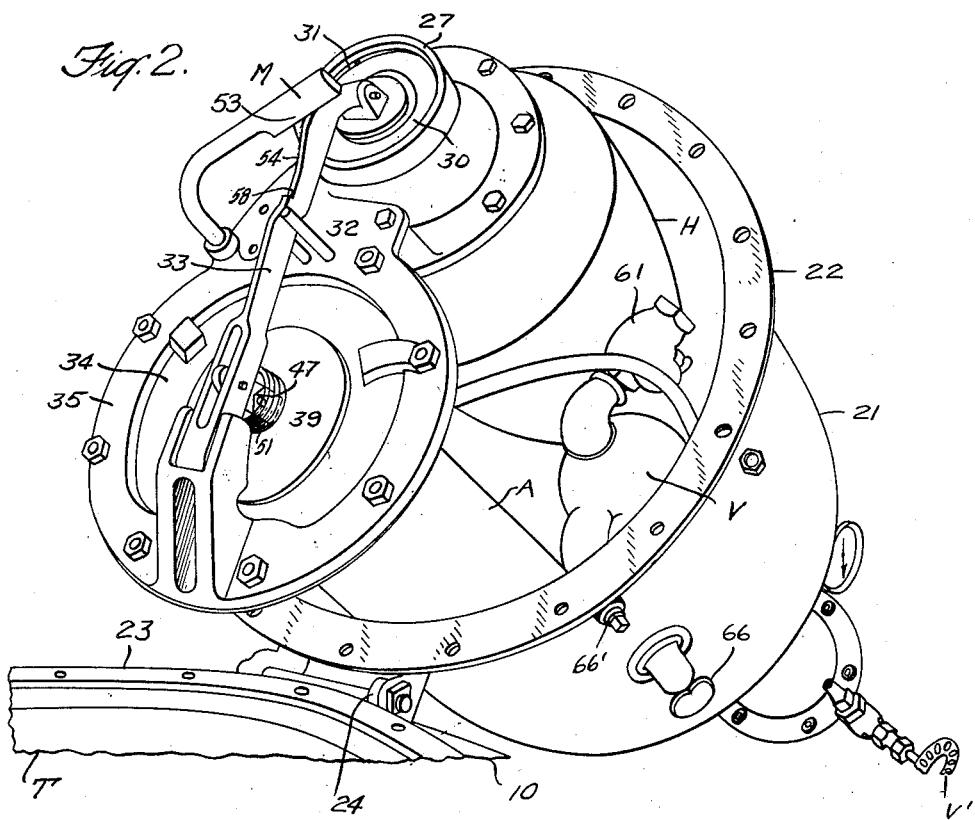
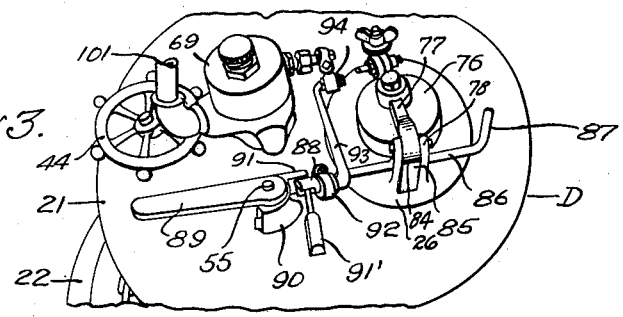

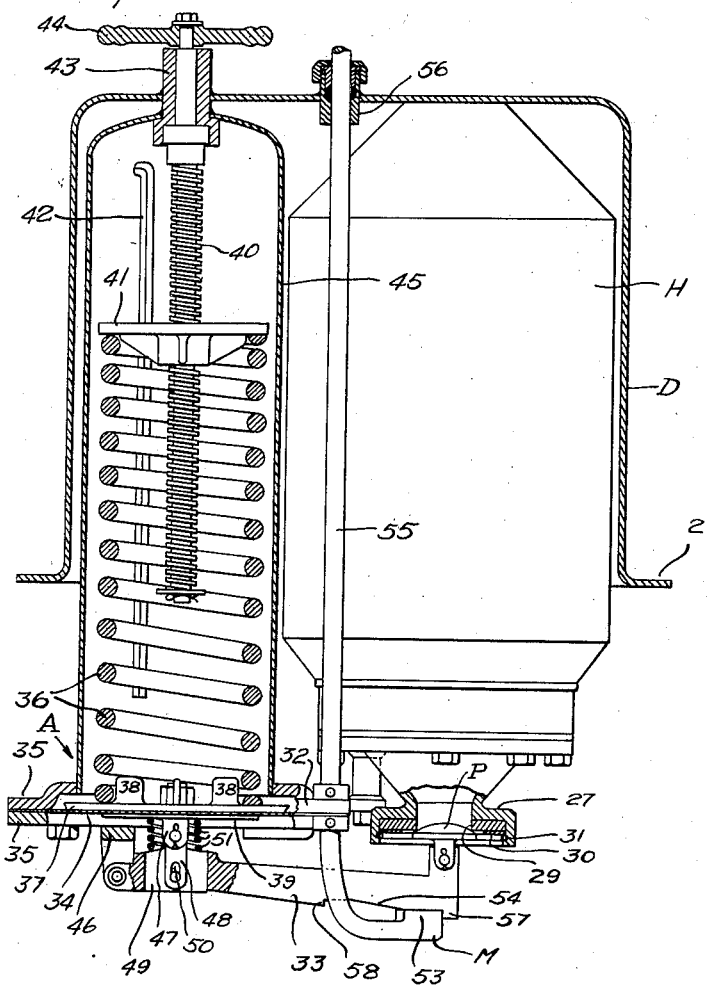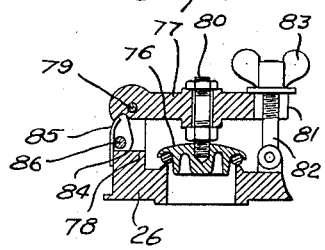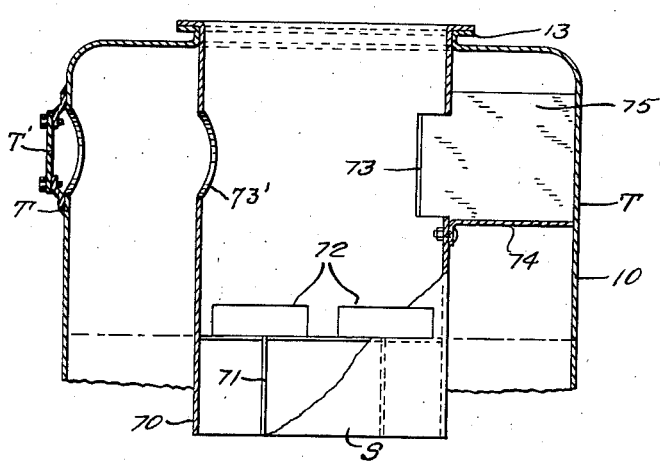

Patented Jan. 23, 1940

2,188,277

UNITED STATES PATENT OFFICE 2,188,277

ACETYLENE GENERATOR

Maurice P. De Motte, Clarence H. Baker, and Ralph C. Pierson, Indianapolis, Ind., assignors, by mesne assignments, to Oxweld Acetylene Company, a corporation of West Virginia Application April 24, 1937, Serial No. 138,752

13 Claims. (Cl. 48—53)

This invention relates to acetylene generators of the carbide-to-water type, and particularly to the feed-valve operating mechanism of such generators, and to interference mechanism adapted to insure a particular sequence of steps in recharging the same.

When granular calcium carbide is fed from a hopper into the water tank of an acetylene generator, various methods of feeding are employed, including pressure-operated feed-valve closing mechanism, the functioning of which depends upon the pressure of acetylene within the generator. When it is desired to begin generating acetylene within this type of generator, the feed valve often is opened too wide, which allows a surplus of calcium carbide to be fed to the water within the generator, thus causing the initial generation of too much acetylene after the feed valve has been closed by the pressure-operated mechanism. This over-generation of acetylene increases the pressure within the generator to a point where the pressure-relief valve blows off, thus causing an unwarranted waste of acetylene gas.

Transporation of a portable acetylene generator in the field usually requires emptying the same, or maintaining sufficient pressure within the generator to prevent jarring open the feed-valve. Considerable time is lost in emptying and recharging such generators each time it is desired to move them, and it is impractical to maintain sufficient pressure within the generator to prevent the feed valve opening during transportation. Furthermore, water in the generator often splashes onto the carbide feed mechanism if the generator is moved in the field without emptying the same.

The principal objects of this invention are to overcome these and other objectionable features of prior acetylene generators; and to provide automatic pressure-operated apparatus for controlling the feed-valve of an acetylene generator in combination with means for limiting the opening of the feed-valve during the initial stage of acetylene generation; to provide means for locking the feed-valve in closed position during periods of shut-down, and when the generator is being moved between jobs in the field; to provide baffle means within the generator for preventing water therein from splashing onto the feed-valve and its operating mechanism; to provide simple mechanism for insuring a definite sequence of steps during recharging of the generator; and generally to provide a compact generator having most of its parts enclosed and less apt to be damaged but easily accessible for inspection or repair.

The above and other objects and the novel features will become apparent from the following specification and the accompanying drawings, in which:

Fig. 2 is a perspective view of a portion of the generator shown in Fig. 1, showing the relation of the various operating elements within the dome of the generator;

Fig. 3 is a perspective top view of a portion of the generator shown in Figs. 1 and 2, showing the relation of part of the interference mechanism constituting one feature of this invention;

Fig. 4 is an elevational view, partly in section, of a detail of the generator, showing the relation of the feed-valve operating mechanism to the carbide hopper;

Fig. 5 is a detail sectional view of the charging door and interference mechanism therefor;

Fig. 6 is a detail view of a portion of the interference mechanism; and

Fig. 7 is a detail elevational view, partly in section, of the splash-preventing baffle.

Figure 1:
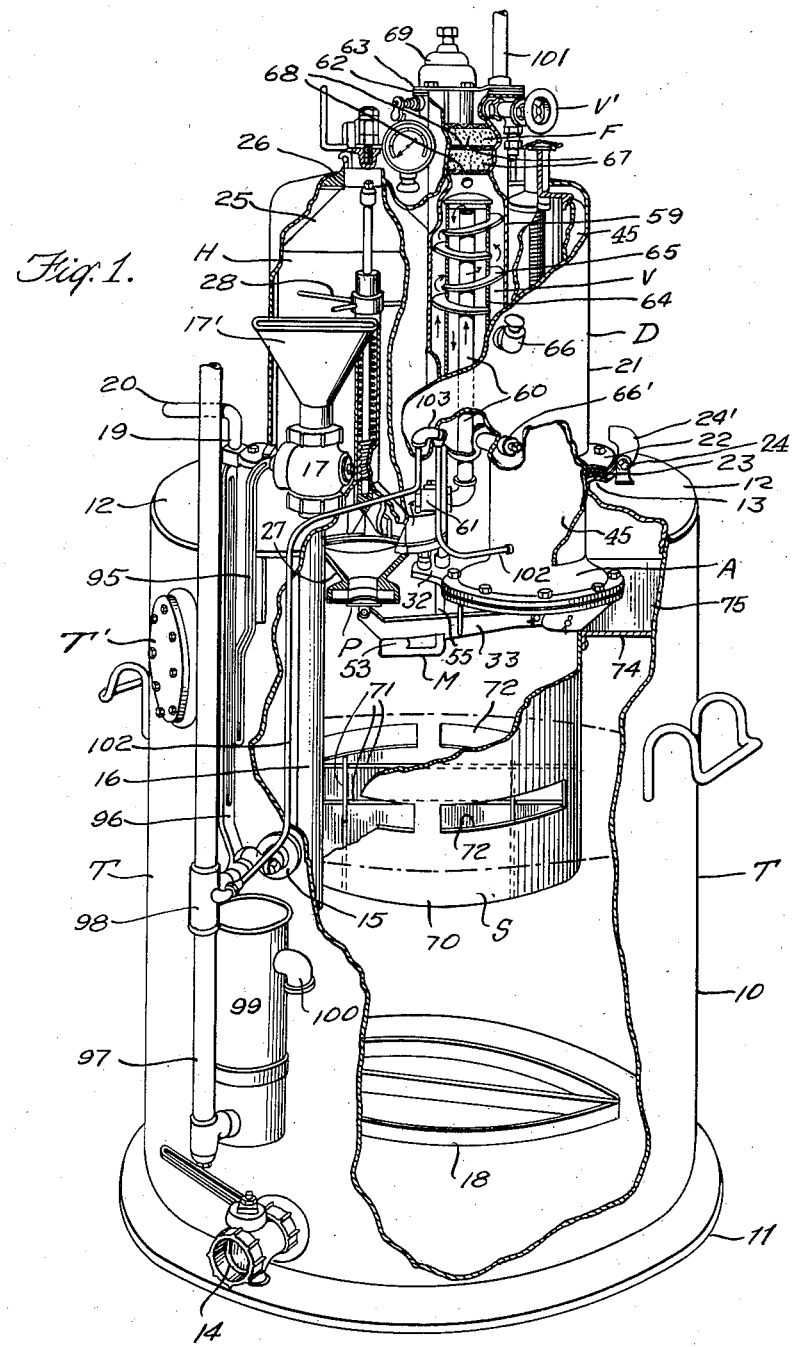
Fig. 1 is a perspective view, partly broken away, of an acetylene generator embodying the principles of this invention.

Referring to the drawings, the acetylene generator, as shown, comprises a tank T adapted to contain water in its lower portion and to form an acetylene-collecting chamber in its upper portion; and a dome D bolted and hinged to the top of the tank T, and constructed to house a carbide hopper H, a hydraulic back-pressure valve V, an automatic pressure-controlled feed-valve operating mechanism A, and a manually operable feed-valve operating device M. The arrangement and construction of the dome D and the devices secured therein is such that, by swinging the dome about the hinge connecting it to the tank T, such devices will be readily accessible for cleaning, replacing, adjusting, or repairing, as shown by Fig. 2.

The automatic feed-valve operating device A is secured to the carbide outlet casting of the hopper H and supports an operating lever for a poppet valve P which is adapted to close the hopper outlet. Pressure within the tank T acts upon a diaphragm of the mechanism A for controlling the position of the poppet valve P. The manually operable device M is located in such position relative to the mechanism A and the operating lever for valve P that it may lock said valve in closed position and also limit the opening thereof during the initial stage of acetylene generation. The device M is adapted to be used until sufficient pressure is established within tank T to operate the pressure-responsive mechanism A, at which time the device M may be moved to non-operating position.

A splash-preventing device S is mounted within the tank T to prevent water within the tank from splashing against the feed-valve and its operating mechanism.

The tank T comprises a shell 10 having an open top, a closed bottom, and a foot-ring flange 11 welded to the outside of the latter. An annular shoulder plate 12 provided with a horizontally disposed flange 13 is welded to the open top of the shell 10. The tank T is further provided with a carbide residue outlet valve 14, an overflow valve 15, and a filling tube 16 which projects through the plate 12; and the tube 16 has a filling valve 17 and a funnel 17'. A residue agitator 18 is located near the bottom of the tank T and is secured to a rod 19 which extends through a stuffing box in the plate 12 to a point outside of the tank T, where it is bent to provide a handle 20 for turning the rod and oscillating the agitator. The valve 17 and the funnel 17', as well as the handle 20, are disposed within the cylindrical outline of the tank T, where they are less apt to be damaged. The tank also has a handhole, closed by a coverplate T'; located directly opposite the hopper outlet, to permit easy access to the carbide feed valve and adjoining parts without removing the dome D.

The dome D comprises an inverted cup-shaped shell 21, the internal diameter of which conforms with the inner diameter of the plate 12. A horizontally disposed flange 22 is formed on the lower edge of the dome D, so that the latter may be bolted to the flange 13, a gasket 23 being clamped between these flanges to form a seal between the tank T and the dome. The dome D and the tank T may be separated by removing the clamping bolts about the flanges 13 and 22, but complete removal of dome D from the tank T is not necessary, since they are connected by a hinge 24 whereby the dome may be swung fully open and so that a lug 24' on the hinge engages the plate 12 and supports the dome with the parts therein accessible for inspection or repair.

The hopper H comprises a sheet-metal shell 25 having a conical upper end rigidly secured to a charging door flange 26 welded within an opening in the top of the dome D. The lower conical end of the hopper H is provided with a carbide feed outlet 27. For the purpose of cutting packed calcium carbide that may form a bridge across the outlet 27, a cutter assembly 28 is provided within the hopper H. The cutter assembly forms no part of the present invention, being covered in a co-pending application of Robert J. Kehl, Serial No. 34,502, filed August 3, 1935.

Referring to Fig. 4, the hopper outlet 27 has a compressible valve seat 29, held in registry with the outlet by an annular metallic plate 30 and a spring ring 31. The internal diameters of the annular plate 30 and the ring 31 are greater than that of the seat 29, so that the valve P and its seat may form an effective seal between the hopper H and the tank T. Exact alignment of the valve P with the seat 29 is maintained at all times because the outlet 27 is rigidly attached to the mechanism A by a flange 32 and the valve P is supported by a lever 33 pivotally mounted on the bottom of the mechanism A.

The mechanism A comprises a pressure-sensitive device adapted to control the operation of the valve P in accordance with a predetermined pressure within the generator. As shown, a pressure-sensitive diaphragm 34 is securely clamped between a pair of annular rings 35 and one side of the diaphragm is adapted to be acted upon by gas pressure within the generator while an adjustable compression spring 36 presses against its other side. In order to transmit the compressive force of spring 36 to the diaphragm 34, a pressure plate 37 having peripherally spaced lugs 38 is positioned between the one end of spring 36 and the diaphragm 34. Pressure plate 37 is secured to the diaphragm 34 and to a plate 39 on the side of diaphragm 34 that is subject to pressure fluctuations within the generator. A threaded shaft 40 extends through an opening in, and cooperates with, a plate 41 to vary the degree of compression of the spring 36. A stationary rod 42 slidingly passes through an aperture in plate 41 and prevents the same from rotating when the threaded shaft 40 is turned. The upper extremity of the threaded shaft extends through a bushing 43 which is fastened within an opening in the dome D. A hand-wheel 44 is secured to the extended end of the shaft 40 and may be rotated to adjust the pressure of the spring 36. A housing 45 of sheet metal has its top portion welded to the bushing 43 and the bottom thereof welded to the uppermost annular ring 35, thereby enclosing the operating structure of the mechanism A and effecting a rigid support for the same.

Automatic control of the valve P by the mechanism A is accomplished by pivotally connecting the lever 33 to a yoke 46 welded or otherwise fastened to, and depending from, the lower annular ring 35. The lever 33 and the diaphragm 34 may be connected by providing a stud 47 on plate 39, to which is pivoted a link 48 extending within a slot 49 in the lever 33 and fastened to said lever by a pinned connection. This pinned connection includes an elongated slot 50 through which the pin is adapted to pass, its function being hereinafter described. The lost motion of this connection is taken up by a compression spring 51 encircling the stud 47 and the upper portion of link 48. One end of the spring 51 abuts against the plate 39 and the other end rests on the yoke forming slot 49 of lever 33 and encircles the link 48.

A manual feed-valve operating device M is provided for locking the valve P in closed position, and to limit its opening during initial gas generation so that a much smaller quantity of carbide will flow to the tank T than when said valve is fully opened. The device M comprises an element such as an arm 53 supported in position relative to the lever 33 so that it may slide along and cooperate with a cam surface 54 formed on the under edge of lever 33. The arm 53 and the cam surface 54 in one position cooperate to lock the valve P in closed position, and they permit opening of valve P a limited amount less than the maximum opening of said valve when they are moved to another relative position. The arm 53 may be operated by a rod 55 extending from the outside of dome D through a stuffing box 56 downwardly to a point adjacent the lever 33 where the arm 53 is rigidly secured to such rod.

The spring 51 between the diaphragm plate 39 and lever 33 maintains the cam surface 54 in engagement with the arm 53 while they are in cooperative position. The spring 51 also provides means for effecting positive opening of the valve P in the event it sticks in closed position when the arm 53 is moved toward stop 58. The lost motion connection between link 48 and lever 33 permits the manual operation of the valve P without unduly straining the diaphragm 34. A pair of stops 57 and 58 are provided at the extremities of the cam surface 54 on the lever 33 for limiting the operative throw of the arm 53.

The mechanism comprising spring 51 and the lost-motion connection forms part of the subject matter of a copending application of Maurice P. De Motte, Serial No. 154,159, filed July 17, 1937.

Feed valve P may be locked in closed position by turning rod 55 so that arm 53 engages stop 57, thus insuring the positive closing of said valve during periods of shut-down or during transportation of the charged generator. When it is desired to continue generation of acetylene, feeding of calcium carbide to the water within tank T may be controlled and limited to a relatively low rate by oscillating arm 53 between its lock and an intermediate position. When sufficient pressure has been established within the generator so that mechanism A will control the opening and closing of the valve P, manually-operable arm 53 may be rendered ineffective by turning rod 55 to the feeding position. This is possible because arm 53 will clear the stop 58 when the valve P is held in closed position by the mechanism A.

Acetylene gas generated within the generator is withdrawn through a hydraulic back-pressure valve V, a filtering device F, and thence to a service valve V'. (See Fig. 1.) The valve V is positioned within the dome D in fixed relation with the hopper H and the mechanism A, and comprises an outer cylindrical shell 59 closed at the bottom and provided with a gas-conducting pipe 60 which extends longitudinally within the shell 59 to a point spaced from the top thereof and has a check valve 61 at its lower inlet end communicating with the gas collecting chamber in tank T. The upper end of the shell 59 has a flange which rests upon a flange 62 of the dome D. A cover plate 63 is bolted to the respective flanges, thus providing a construction which will permit access to a filter F, to be described more in detail below, and the back-pressure valve V by simply removing the cover plate 63.

The back-pressure valve V is further provided with an inner cylindrical shell 64 having a closed top and open bottom. The shell 64 is positioned over the pipe 60 so that its closed top end is spaced slightly from the open end of said pipe. A series of helically arranged baffles 65 is positioned between the inner and outer shells 64 and 59 for providing a circuitous path through which the gas must travel in passing through the back-pressure valve V. A water level plug 66 and a water drain plug 66' are provided in the side of the shell 59 and extend through the wall of dome D for supplying water to, and draining it from the valve V. Near the upper end of the shell 59, a filter F is provided for removing impurities, such as solid particles, from the generated gas as it passes through the valve V. The filter F comprises one or more pads 67 of matted horsehair, or the like, supported between screens 68. An exit from the valve V leading to the service valve V' is provided in the upper portion of shell 59 above the filter F. For relieving excessive pressures which may develop within the generator, an automatically operating pressure-relief valve 69 is connected to the shell 59 at a point below the filter F.

Acetylene, under pressure within the generator, will force the swing check-valve 61 open, flow upward through pipe 60, downward within the space formed by the inner shell 64 and the pipe 60, through the water in the lower portion of the valve V, upward within the space between the outer shell 59 and the inner shell 64, through the filter F and thence to the service valve V'.

In order to impede or prevent the splashing of water within tank T onto the feed valve mechanism during transportation of the generator from one job to another in field-work, a splash-preventing device S has been provided; see Figs. 1 and 7. This device comprises a sheet metal cylindrical baffle 70 having a flange at its upper end clamped between the flanges 22 and 13 of the dome D and the tank T respectively. The lower end of the baffle 70 extends to a point below the water level in the tank T and is provided with a plurality of criss-cross baffles 71 formed by sheet metal plates welded in vertical position to the inner wall of the baffle 70, and to each other at their abutting corners. The baffles 71 divide the water directly below the carbide feed valve into relatively small laterally confined volumes. The baffle 70 has a number of openings 72 through its wall at a point slightly above the water level in the tank T to permit the acetylene generated within the baffle 70 to pass out into the gas-collecting chamber of the tank T. In order to accommodate the diaphragm 34, its supporting rings 35, and the lever 33, an opening 73 is provided in the wall of the baffle 70. Likewise, an aperture 73' is provided in the wall of baffle 70 in alignment with the handhole cover T', in order to permit access through the handhole to the feed valve operating mechanism. A horizontal baffle plate 74 is secured to the baffle 70 just below the opening 73 and to the inner wall of the tank T, and is provided with upwardly extending walls 75, rigidly secured to the baffle 70 just beyond the sides of the opening 73, and also to the inner wall of the tank T. The baffle construction described prevents water within tank T from splashing onto the valve P and its operating mechanism through the opening 73; and the criss-cross baffles 71 and the shell 70 maintain the water in a state of relative quiescence.

In order to insure a definite sequence of steps in recharging the generator so that injury to the operator or damage to the generator will not occur due to the accumulation of the acetylene therein, interference mechanism has been provided which is adapted to cooperate with the carbide-feed mechanism, the charging door, and the pressure relief valve 69. In the present embodiment of the invention, as best shown in Figs. 3 and 5, a charging door 76 is adapted to be clamped in sealed relation with the charging-door flange 26 by a lever 77 extending over the door 76 and pivoted at one end on a boss 78 by a pin 79. The central portion of lever 77 is provided with an adjustable screw 80 adapted to support the door 76 so that it may be pressed into sealed engagement with the flange 26. The other end of lever 77 has a forked portion 81 to receive and cooperate with a fastening means including a pivoted bolt 82 which supports a wingnut 83. The end of lever 77 adjacent the pin 79 is provided with a notch 84 adapted to cooperate with mechanism to be described.

For the purpose of preventing the opening of the charging door 76 when the generator contains acetylene under pressure, and at times other than when the valve P is locked in closed position, the notch 84 in lever 77 is adapted to cooperate with a lug 85 integral with an interference shaft 86.

This interference shaft which is rockably mounted in the extended legs of boss 78, is provided at one end with a handle 87 and at its other end with a yoke 88, see Figs. 6. When the handle 87 is in a vertical position as shown in Fig. 3, lug 85 coacts with the notch 84 and prevents opening of the charging door 76. Movement of handle 87 to a horizontal position releases the door 76, but this movement is controlled by the position of an oscillatable feed handle 89 which is connected to the feed-valve control mechanism M. This feed handle is provided with an interference disc 90 adapted to be positioned between the legs of yoke 88 when the handle is in its feed position. The disk 90, however, does not interfere with the movement of the yoke 88 when the feed handle 89 is in its closed position, as shown in Fig. 3.

The feed handle is further provided with an arm 91 having a hole therein. When the feed handle is in closed position, this hole and the slot between the legs of the yoke 88 are aligned so that a padlock 91' may be used to lock the same in position by passing the hasp of the padlock through the hole and around one of the legs of the yoke, thus preventing unauthorized operation of the feeding mechanism M.

In order to insure release of any accumulated acetylene within the generator prior to the opening of the charging door 76, movement of the interference handle 87 from a vertical to a horizontal position is linked with the operation of the relief valve 69 by providing an angularly related arm 92 integral with the yoke 88. The free end of arm 92 is connected to one end of an S-shaped link 93, and the other end of the link 93 is connected to a rockable arm 94 mounted on an operating shaft of the relief valve 69. Upon movement of interference handle 87 from the vertical to the horizontal position, movement of link 93 will cause the opening of the relief valve 69.

Additional interference mechanism has been provided in order to prevent the over-filling of tank T with water. This interference mechanism has been designed to make it impossible to open the filling valve 17, see Fig. 1, until the overflow valve 15 has been opened. To this end, the filling valve 17 is provided with a relatively long operating lever 95 which extends downwardly along the outside of the tank T. The overflow valve 15 is provided with a relatively long operating lever 96 which extends upwardly along the outside of tank T, and it is positioned outwardly of, and in overlapping aligned relation with the lever 95. This arrangement makes it necessary to withdraw lever 96, thereby opening the overflow valve 15, before lever 95 can be moved to a position which will open the filling valve 17.

The generator to which the principles of this invention have been applied, may be either an out-door portable or an in-door stationary unit, and the structure thus far described may be converted into an in-door acetylene generator by providing means for insuring the venting of released acetylene to the atmosphere outside of the building in which the generator is to be located. This may be accomplished by providing a generator vent-pipe 97 connected to the overflow valve 15 by a T-connection 98 intermediate the ends of said vent-pipe. The lower end of the vent-pipe 97 is provided with an open-top trap 99 having an outlet 100 through which water from tank T may drain to a sewer. Another vent-pipe 101 is connected to the outlet relief valve 69, and it and the vent-pipe 97 extend outside the building in which the generator is installed.

In the event that the diaphragm 34 develops a leak, provision is made to prevent this leakage from escaping into the room in which the generator is located. In the embodiment disclosed, a vent-tube 102, which extends through a separable union 103 located in the side wall of the dome D, communicates with the vent-tube 97 at the T 98 and with the space in the housing of the mechanism A that contains the spring 36, to instantly vent gas which may leak through the diaphragm 34.

Although the various features of the improved generator have been shown and described in detail to fully disclose one embodiment of this invention, it will be evident that numerous changes may be made in such details and certain features may be used without others, without departing from the principles of the invention.

We claim:

1. An acetylene generator comprising a tank adapted to contain water in its lower portion and to form a gas collecting chamber in its upper portion; a hopper mounted on said tank, said hopper being adapted to contain calcium carbide, and provided with a carbide outlet; a carbide feed valve mounted in operative relation to said outlet; means responsive to a predetermined pressure within said generator for controlling the opening of said valve and the flow of carbide from said hopper to the water within said tank; and separate mechanical means for controlling the feed of carbide from said hopper to said water before said predetermined pressure has been established within said generator, including means for preventing the complete opening of said feed valve until a predetermined pressure has been established in said gas collecting chamber.

2. An acetylene generator as claimed in claim 1, wherein said pressure-responsive means is adapted to control the operation of said valve, and its housing is adapted to maintain said valve and hopper outlet in aligned relation.

3. An acetylene generator as claimed in claim 1, wherein said separate means comprises a manually operable element adapted to cooperate with a cam surface associated with said valve.

4. An acetylene generator as claimed in claim 1, wherein said separate means comprises a manually oscillatable arm adapted to lock said valve in closed position at one point of its travel, to permit partial opening of said valve at another point of its travel but preventing complete opening of said valve until said predetermined pressure has been established in said gas collecting chamber.

5. An acetylene generator comprising a tank adapted to contain water in its lower portion and to form a gas collecting chamber in its upper portion; a carbide hopper having an outlet adapted to be opened and closed by a valve; means responsive to a predetermined pressure within said generator for controlling the opening and closing of said valve; separate means for controlling the opening and closing of said valve but preventing complete opening of said valve until said predetermined pressure has been established within said generator, the construction and arrangement being such that, when said predetermined pressure has been established within said generator, said separate means may be moved to an ineffective position.

6. An acetylene generator comprising a tank adapted to contain water in its lower portion and to form a gas collecting chamber in its upper portion; a carbide hopper having an outlet adapted to be opened and closed by a valve; means responsive to a predetermined pressure within said generator for controlling the opening and closing of said valve; separate means for controlling the opening and closing of said valve before said predetermined pressure has been established within said generator, said separate means comprising an arm adapted to cooperate with a cam surface associated with said valve, and stops are provided at the extremities of said cam surface, one of which is so located and of such height that it will not interfere with said arm when said valve is held in closed position by said pressure-controlled means.

7. An acetylene generator comprising a tank adapted to contain water in its lower portion and to form a gas collecting chamber in its upper portion; a hopper provided with an outlet opening into said chamber and a feed valve controlling said outlet; water outlet means operable to establish a normal water level in said tank; means, located within said chamber for opening and closing said valve; and a housing for impeding water within said tank from splashing against said hopper outlet, said valve and said valve-operating mechanism, when the generator is moved from one place to another, said housing being provided with means extending below said level established by said water outlet means for dividing the water directly below said valve into relatively small laterally confined volumes and to retain the water in a state of relative quiescence.

8. An acetylene generator comprising a tank adapted to contain water in its lower portion and to form a gas-collecting chamber in its upper portion; a hopper provided with an outlet opening into said chamber and a feed valve controlling said outlet; means, located within said chamber for opening and closing said valve; and means for impeding water within said tank from splashing against said outlet, said valve and said valve-operating mechanism, when the generator is moved from one place to another, said splash-impeding means comprising a housing surrounding said valve and said valve-operating mechanism, and which extends to a point below the surface of the water, the interior of said housing below the surface of the water being provided with baffles adapted to retain the water directly below said valve and said valve-operating mechanism in a state of relative quiescence.

9. An acetylene generator comprising a lower portion adapted to contain water and to form a gas-collecting chamber above said water; an upper portion adapted to contain a carbide hopper having a charging door and a carbide outlet; a carbide feed valve mounted in operative relation to the outlet of said hopper; means responsive to a predetermined pressure within said generator for controlling said valve to regulate the flow of carbide from said hopper, through said outlet to the water within said tank; additional means for manually controlling the opening of said valve and the feed of carbide from said hopper to said water including means for preventing the maximum opening of said carbide feed valve before said predetermined pressure has been established within said generator, said last-mentioned means including an oscillatable handle on the exterior of said generator and adjacent to said charging door; and mechanism connected to said charging door and cooperating with said manual control means for preventing the opening of said charging door when said handle is positioned to allow said feed valve to open under the influence of either of said control means.

10. An acetylene generator comprising a tank adapted to contain water in its lower portion and to form a gas-collecting chamber in its upper portion; a hopper provided with an outlet opening into said chamber and a feed valve controlling said outlet; means, located within said chamber for opening and closing said valve; water outlet means operable to establish a normal water level in said tank; and a housing for impeding water within said tank from splashing against said valve and said valve-operating mechanism, when the generator is moved from one place to another, said housing extending a substantial distance below said level established by said water outlet means in said tank and being provided with gas passage openings therein at a point immediately adjacent to and extending a relatively short distance above said water level.

11. An acetylene generator comprising a tank adapted to contain water in its lower portion and to form a gas-collecting chamber in its upper portion; a carbide hopper within said generator provided with a feed valve for feeding carbide to the water in said tank and an externally disposed charging door; a pivoted lever arranged to hold said door closed; means including an oscillatable handle mounted on said generator adjacent of said charging door for opening and locking said feed valve in closed position; a rockable interference shaft device having a portion associated with said lever to prevent the opening of said door in one position of said shaft; and an oscillatable disc connected to said valve locking means adapted to cooperate with another portion of said interference shaft device when in said position to interfere with said lever for preventing the opening of said charging door when said feed valve is open, said other portion of said interference shaft device being arranged to interfere with said disc when said device is in the position of its rockable travel that allows the opening of said charging door to prevent movement of said handle when said charging door is openable.

12. An acetylene generator comprising a tank adapted to contain water in its lower portion and to form a gas-collecting chamber in its upper portion; a carbide hopper provided with a feed valve for feeding carbide therefrom to the water in said tank and an external charging door; a pivoted lever arranged to clamp said door closed; means including an oscillatable handle adjacent to said door operable to open and to lock said feed valve in closed position; a pressure relief valve associated with said gas-collecting chamber and having a valve opening means; a rockable interference shaft device having a portion engaging said lever in one position of said shaft to prevent opening of said door; an oscillatable disc connected to said valve locking means adapted to interfere with another portion of said interference shaft device when in engagement with said lever for preventing the opening of said door when said feed valve is open, said other portion of said interference shaft device being arranged to interfere with said disc when said device is in the position disengaging said lever to prevent movement of said handle when said charging door is openable; and means connecting said relief valve opening means with said interference shaft device for mechanically opening said relief valve when said device is in the position disengaging said lever.

13. An acetylene generator comprising a tank adapted to contain water in its lower portion and to form a gas-collecting chamber in its upper portion; a carbide hopper provided with a feed valve for feeding carbide therefrom to the water in said tank and an external charging door; a pivoted lever arranged to clamp said door closed; means including an oscillatable handle adjacent to said door operable to open and to lock said feed valve in closed position; a rockable interference shaft device having a portion engaging said lever in one position of said shaft to prevent opening of said door; a yoke disposed at one end of said shaft; and an oscillatable disc connected to said valve locking means adapted to pass between the legs of said yoke and prevent movement of said shaft out of engagement with said lever when said valve locking means is in the open position, said disc and yoke being arranged to prevent movement of said valve locking device away from its valve locking position when said shaft is disengaged from said lever and said door is openable.

MAURICE P. DE MOTTE.
CLARENCE H. BAKER.
RALPH C. PIERSON.